April 22, 1952 H. W. MORELAND 2,593,909
CANOPY STRUCTURE FOR ATTACHMENT TO TRAYS
Filed Nov. 7, 1949 2 SHEETS—SHEET 1
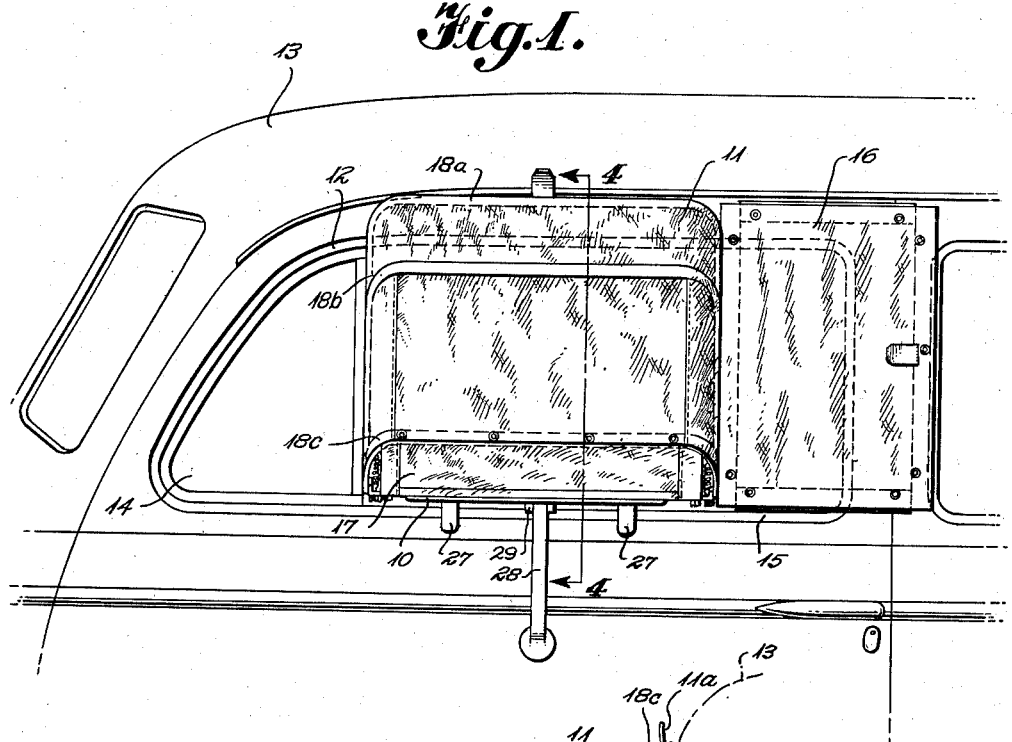
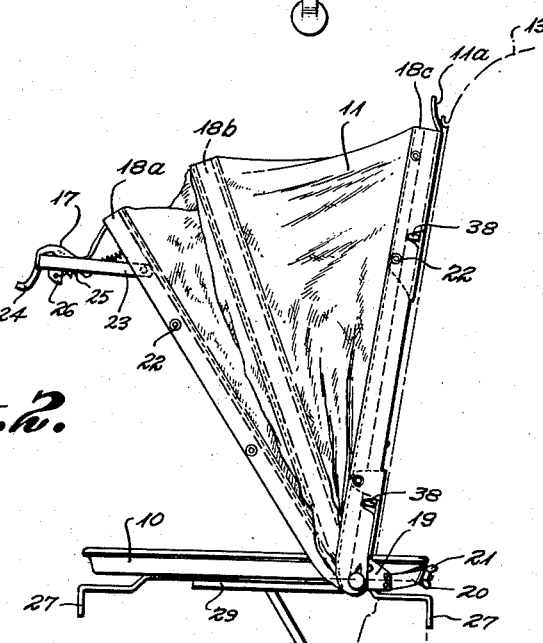
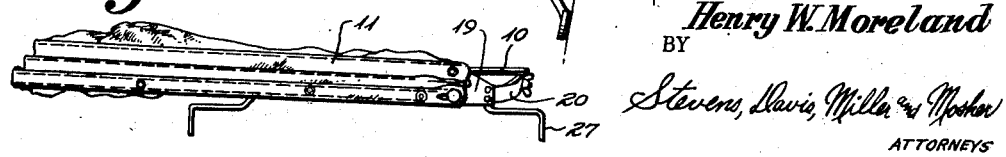
INVENTOR.
Henry W. Moreland
BY
Stevens, Davis, Miller & Mosher
ATTORNEYS April 22, 1952 — H. W. MORELAND — 2,593,909
CANOPY STRUCTURE FOR ATTACHMENT TO TRAYS
Filed Nov. 7, 1949 — 2 SHEETS—SHEET 2
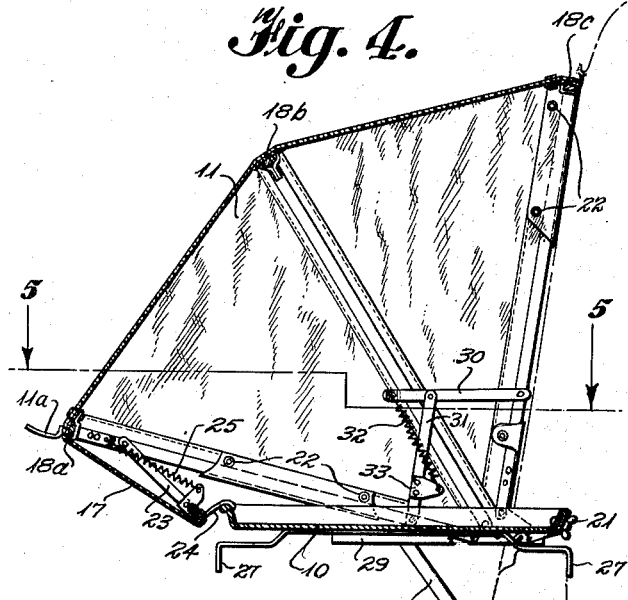
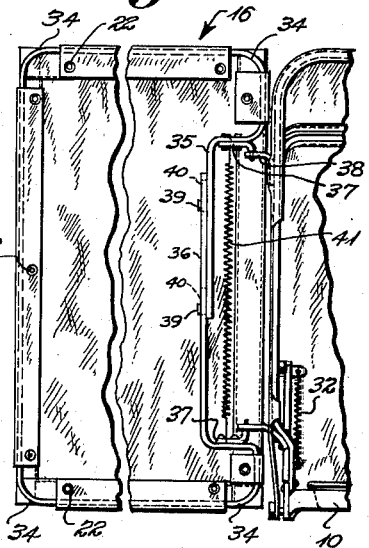
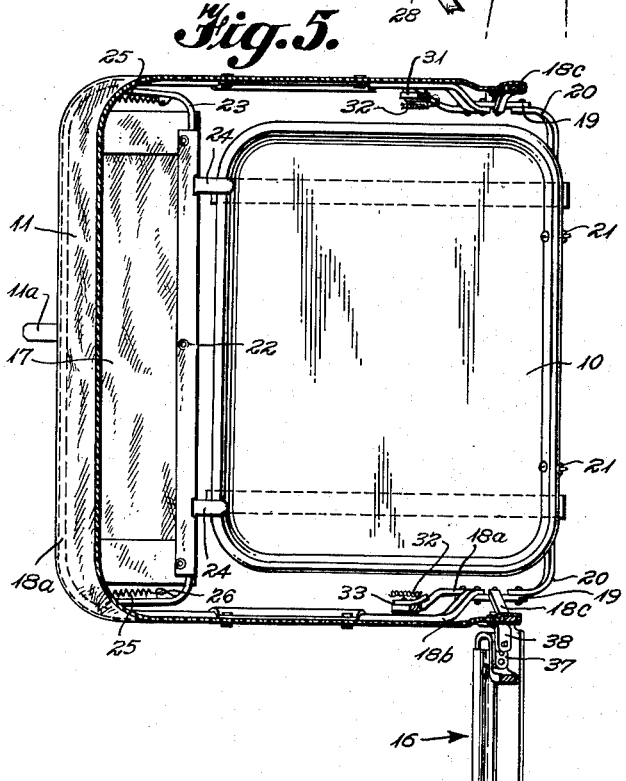
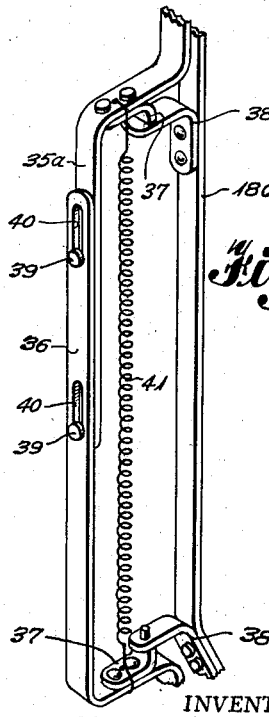
INVENTOR.
Henry W. Moreland
BY Stevens, Davis, Miller & Mosher
ATTORNEYS Patented Apr. 22, 1952

2,593,909

UNITED STATES PATENT OFFICE 2,593,909

CANOPY STRUCTURE FOR ATTACHMENT TO TRAYS

Henry W. Moreland, Camden, Ark.

Application November 7, 1949, Serial No. 125,957

7 Claims. (Cl. 160—127)

This invention relates to a canopy structure and more particularly to a canopy structure for attachment to a "drive-in tray" which canopy structure provides protection for the contents of the tray from wind, rain, dust and the like and protects the user of the contents of the tray from the same.

In recent years the idea of providing curb service to motorists has resulted in the establishment of many so-called "drive-in restaurants." In such restaurants the motorist is served while seated in his automobile by an attendant who places the food or the like on a tray. This tray is detachably fixed to the automobile adjacent the window thereof to provide easy access to its contents by the occupant. The tray is usually a substantially flat metal tray having gently upturned edges and is provided with means to removably fasten the same to the window when the window is completely, or at least partially, open. The tray is usually provided with a pair of legs mounted to the base of said tray, which legs are formed so as to fit over the window-sill or the window itself. Usually a third member is provided which is pivotally mounted at approximately the center of the underside of the tray and which is long enough to frictionally engage the door of the car at a point below and between the legs grasping the window or the window-sill. The weight of the tray and the contents maintain the pivoted member in a position to sustain the tray in a level position.

Previously, the amount of drive-in business was vitally dependent on the weather. During rain, snow, or windy weather, few if any patrons cared to expose themselves to such inclement conditions. In the past, using the trays as then available, inclement weather quickly spoiled the food thereon and then too, due to the necessity of maintaining the window of the automobile in an open position so as to accommodate the tray, the occupant was soon uncomfortably exposed to the prevailing outside conditions.

It is an object of this invention to provide a protective covering for the "drive-in" trays, which to a large measure eliminates all the discomforts and commercial drawbacks previously experienced. The tray is provided with a collapsible covering detachably mounted to the tray and forming a canopy thereover. The covering is adapted to conform with the outline of the window of the automobile and therefore both to protect the contents of the tray and to protect the occupant. The tray is also provided with a hatch extending from the protective cover and engaging the tray, which hatch can be disengaged therefrom to provide access to the tray. The hatchway is provided for the purpose of access to the tray to allow the attendant to remove the contents of the tray or to place additional supplies thereon without exposing the contents to the weather.

It is, therefore, another object of this invention to provide a means coacting with the raised canopy on the tray which permits access to the tray by the attendant without exposing either the contents of the tray or the occupants of the automobile to exterior weather conditions.

Other and further objects of this invention will become apparent from the following detailed description of the drawings:

Figure 1 is a view in elevation showing the tray and the protective covering, according to the teachings of this invention, mounted adjacent the window of an automobile;

Figure 2 is a side view of the tray and protective covering, the protective covering being in partially collapsed attitude;

Figure 3 is a side view similar to Figure 2 but showing the protective covering completely collapsed;

Figure 4 is a view in section taken along the line 4—4 of Figure 1;

Figure 5 is a view in section taken along the line 5—5 of Figure 4;

Figure 6 is a fragmentary front view taken from a position normally occupied by the occupant of a car showing an extension panel attached to the protective cover tray assembly in accordance with the teachings of this invention;

Figure 7 is a perspective view of the means of engaging the extension panel to the protective cover tray as shown in Figure 6.

As shown in Figure 1, the tray 10 and its protective cover 11 are mounted (by means to be hereinafter explained with reference to Figure 2) to the window, generally designated in this figure by numeral 12, of an automobile 13. The window 12 as shown in this figure is similar to those in most modern automobiles having a ventilating window section 14 and a rearward main window section 15, partially shown in this figure by dotted lines. The main window section 15 has the usual sliding windowpane.

The tray is mounted on the window-sill or on a slightly raised portion of the windowpane in the main window section 15 and spaced from the ventilating window section 14 so that the cover 11 in its extended position, as shown in this figure, laps or abuts the rearward edge of the ventilating window section 14.

The vertical dimension of the cover 11 is at least large enough to completely cover the main window section 15 but its horizontal length may be less than the horizontal length of this window section. In that case an extension panel 16 is provided which is adapted to fit on the frame of the cover 11 and which extends horizontally therefrom to cover that portion of the main window section 15 not embraced by the cover 11. The fitting of this panel to the cover frame will be better explained with reference to Figure 6.

The cover 11 is provided with a hatch 17 which is mounted to the cover 11 and to the tray 10. This hatch is capable of removal from contact with the tray 10 in a manner to be better explained with reference to Figures 2 and 4.

What has been shown and described with reference to Figure 1 is the general positioning of the tray 10, its cover 11 and the panel 16 attached thereto with relation to the ventilating window section 14 and to the main window section 15. The cover has been illustrated in the position employed by it when the tray is mounted to the window-sill and the sliding windowpane lowered By virtue of the positioning of all of these elements, the occupant is completely protected from the outside weather conditions and has free access to the contents of the tray.

The cover 11 is of a collapsible nature. The cover can be folded into a compact or semi-compact form as illustrated in Figure 2. When in this form as shown in Figure 2, the hatch 17 retracts to a position there shown, out of engagement with the tray 10, by virtue of the action of spring 25. The cover 11, usually of a rubberized weatherproof plastic, has a plurality of U-shaped frame members 18a, 18b and 18c. These members are pivotally mounted to brackets 19 in a manner better appreciated with reference to Figures 4 and 5. The brackets 19 are fixedly mounted to opposite ends of a metal bar 20, which is in turn mounted to the front edge of the tray 10 by any suitable means such as a plurality of wing nuts 21. The plastic protective cover fits over the frame members and is attached to each member by a plurality of snap locks 22. The portions of the cover 11 which are mounted to the frame members are usually reinforced by canvas strips or the like, which strips are sewn to the cover and carry the male and female parts of the snap locks 22. The frame members are fitted against the canvas strips and the male and female members of the snap lock 22 interlocked about these members to secure them, in turn, to the cover 11.

The hatch 17, which is shown here out of engagement with the tray, is usually of the same material as that of the cover 11 and is mounted to the cover as a separate or as an integral part of the cover. In the latter case, it extends over the outermost frame member 18a and is sewn to the canvas strip which envelops this frame member. Its edges are also reinforced by canvas strips. The hatch has a U-shaped frame member 23 which is pivotally mounted to the frame member 18a at both ends and is fixed to the plastic covering of the hatch in the same manner as heretofore explained with the attachment of the plastic cover to the frame members 18a, 18b and 18c.

The frame member 23 has two stop bars 24 integral therewith which are adapted to fit about the tray 10 holding the hatch in frictional engagement therewith. When the hatch is loosened from the tray by removing the stop bars 24 from engagement therewith, the hatch retracts to a position as shown in this figure due to the action of the spring 25. The action of the spring 25 also maintains the stop bars 24 in engagement with the tray 10. The spring 25 is mounted between the frame member 18a and the frame member 23, the latter mounting being accomplished by any suitable means such as a metal tab 26 mounted to and extending below the member 23.

The tray 10 as shown in this figure is mounted to the car 13 in the position shown in Figure 1 by means of legs 27 fixedly attached to the bottom of said tray. The legs are placed over the window as slightly raised or over the window-sill when the window is completely open. The center leg 28 is slidably mounted in a slotted housing 29, which is mounted to the bottom of the tray at approximately the middle thereof. The leg 28 frictionally engages the door of the automobile 13 and is tipped with some sort of rubberized material to provide a suitable frictional engagement therewith. When in extended position as shown in this figure, the leg 28, cooperating with the legs 27, holds the tray in the horizontal position as shown.

When the tray 10 is not in use, the cover 11 is folded and stored in an attitude illustrated in Figure 3.

When the cover is unfolded from the position shown in Figure 3 and mounted to the car as shown in Figure 1, in a manner described in connection with Figure 2, the coaction of the frame members and associated devices maintains the cover in the position shown in Figure 1. To better appreciate how this position is maintained, reference is now directed to Figure 4.

In Figure 4, which is a view taken along the line 4—4 in Figure 1, the tray with its cover is mounted to the automobile 13 in a manner and in a position relative to the window of the car as described with reference to Figure 1. When in this position, the cover 11 tends to remain in unfolded position. This is due to the connection between the frame members 18a and 18c. This connection comprises a toggle arrangement consisting of a bar 30 pivotally mounted to the frame member 18c. At some point remote from this point of mounting, another bar 31 is pivotally mounted to the bar 30. At the extremity of the bar 30 and spaced from the junction of bars 30 and 31 is attached one end of the spring 32. The other end of the spring 32 is mounted to the bar 31 by means of a bracket 33 mounted to the bar 31 and extending at a right angle therefrom. The action of the spring 32 against the frame member 18c through the bar 30 tends to keep the frames 18a and 18c in maximum spaced relation determined by the amount of covering material comprising the cover 11 extending between the frame members 18a and 18c. When the cover has been, by the action of the spring 32 on the frame members 18a and 18c, extended its full length, the spring will maintain the members 18a and 18c in their respective positions as shown in this figure. The spring 32 is also capable of maintaining the frame members in a collapsible position as shown in Figure 3. When the cover is manually collapsed by grasping the tab 11a mounted to the cover 11 and the cover 11 pulled in a downward direction, a position is reached at which the end of this spring 32 mounted to the bar 30 is lower than that end of the spring mounted to the disc 33. In this position the spring tends to maintain the frame members in a collapsed attitude. This is the usual operating function of a toggle arrangement understood by workers in this art.

All the frame members are pivotally mounted to the metal bar 20. A bracket 19 is attached to this bar 20 as heretofore explained and the frame members pivotally mounted to this bracket but on separate and individual axes. It is practical in some instances to pivotally mount each frame member to the same axis of pivot. When the frame members are positioned to form an extended canopy over the tray, the stop bars 24 of the hatch 17 are engaged over the rim of the tray 10 and, by virtue of their peculiar configuration, hold the hatch in this position against the action of the spring 25, which spring is mounted between the frame members 23 and 18a as heretofore explained with reference to Figure 2.

As has been heretofore explained with reference to Figure 1, in some cases the protective covering has a horizontal dimension which is insufficient to completely cover the window opening. In this case, an extension panel 16 is mounted to the frame of the covering 11 in a manner illustrated by Figure 5. This figure also serves to better illustrate the individual mounting of the frame members 18a, 18b and 18c on the bracket 19, which bracket is mounted to the metal bar 20. The particular construction of the extension panel 16 and the mounting of this panel to the frame of the cover 11 will better be explained with reference to Figures 6 and 7.

In Figure 6 the panel 16 is comprised of a frame member 34 about which a weatherproof plastic sheet is attached in a manner similar to the attachment of the weatherproof sheet to the cover 11 as has been heretofore explained. The frame 34 is substantially rectangular in contour except that one side is disfigured. This side has two substantially flat S-shaped portions 35 and 36 extending toward the center of the rectangle. These portions overlap and are provided with slot and pin arrangements. Mounted to the inner faces of the flat S-shaped portions 35 and 36 and facing each other are two L-shaped metal bars 37 with pointed ends. These pointed ends engage in recesses formed in protruding metal pieces 38 mounted to the frame member 18c of the cover 11 and hold the panel 16 in association with the cover-tray assembly. The mounting of the L-shaped bars 37 in these recesses is better explained with reference to Figure 7.

In Figure 7 the portion 35 is provided with pins 39 longitudinally spaced thereon and the portion 36 is provided with longitudinal slots 40 to receive said pins. Spring 41 mounted at opposite ends of the two flat S-shaped portions 35 and 36 tend to maintain the distance between the L-shaped metal bars 37 with pointed ends at a minimum distance apart depending, of course, on the relative positioning of the pins 39 and the length and positioning of the slots 40. In normal position the portion 35 must be pulled upwardly against the action of the spring 41, causing the pins 39 rigidly fixed to the portion 35 to slide in the slots 40, thus increasing the distance between the L-shaped metal bars 37 to a distance where their pointed ends will engage in the recesses provided in the metal pieces 38. When a sufficient distance between the pointed ends has been reached, pressure against the spring 41 is released, the pointed ends engage in the said recesses, and the extension panel section is thereby engaged with the cover tray assembly.

What has been heretofore described is a particular embodiment of this invention. Other embodiments which are obvious to one skilled in this art are contemplated to be within the spirit of this invention.

What is claimed is:

1. A canopy structure for attachment to a rectangular tray, said tray being supported from an automobile in substantially the plane of the lower edge of a window opening therein with one edge of said tray close to the automobile body, said canopy structure including a canopy, means to support said canopy from the edges of said tray contiguous with the edge of said tray close to said automobile body and at points on said contiguous edges near to the juncture of said contiguous edges with said edge close to said automobile body for pivotal movement from an extended position in which the said canopy covers the tray and the window opening, to a folded position in which the canopy lies substantially in the plane of the tray.

2. A canopy structure for attachment to a rectangular tray, said tray being supported from an automobile in substantially the plane of the lower edge of a window opening therein with one edge of said tray close to the automobile body, said canopy structure including a canopy, means to support said canopy from the edges of said tray contiguous with the edge of said tray close to said automobile body and at points on said contiguous edges near to the juncture of said contiguous edges with said edge close to said automobile body for pivotal movement from an extended position in which the said canopy covers the tray and the window opening, to a folded position in which the canopy lies substantially in the plane of the tray, a flap pivotally mounted to said canopy supporting means, and adapted to engage the edge of said tray opposite that edge close to the said automobile body to provide a disengageable hatch for access to said tray when said canopy is in extended position.

3. A canopy structure for attachment to a rectangular tray, said tray being supported from an automobile in substantially the plane of the lower edge of a window opening therein with one edge of said tray close to the automobile body, said canopy structure including a canopy, means to support said canopy from the edges of said tray contiguous with the edge of said tray close to said automobile body and at points on said contiguous edges near to the juncture of said contiguous edges with said edge close to said automobile body for pivotal movement from an extended position in which the said canopy covers the tray and a portion of said window opening, to a folded position in which the canopy lies substantially in the plane of the tray, an extension panel disengageably mounted in the plane of said window to said canopy supporting means to cooperate with said canopy to provide a cover for that portion of said window not covered by the said canopy when supported in an extended position by said canopy supporting means.

4. A canopy structure for attachment to a rectangular tray, said tray being supported from an automobile in substantially the plane of the lower edge of a window opening therein with one edge of said tray close to the automobile body, said canopy structure including a canopy, means to support said canopy from the edges of said tray contiguous with the edge of said tray close to said automobile body and at points on said contiguous edges near to the juncture of said contiguous edges with said edge close to said automobile body for pivotal movement from an extended position in which the said canopy covers the tray and a portion of said windows opening, to a folded position in which the canopy lies substantially in the plane of the tray, a flap pivotally mounted to said canopy supporting means, and adapted to engage the edge of said tray opposite that edge close to the said automobile body to provide a disengageable hatch for access to said tray when said canopy is in extended position, an extension panel disengageably mounted in the plane of said window to said canopy supporting means to cooperate with said canopy to provide a cover for that portion of said window not covered by the said canopy when supported in an extended position by said canopy supporting means.

5. A canopy structure for attachment to a rectangular tray, said tray being supported from an automobile in substantially the plane of the lower edge of the window opening therein with one edge close to the automobile body, said canopy structure including a canopy, a plurality of U-shaped frame members pivotally mounted at their ends to said tray on separate but closely spaced axes for supporting said canopy, a toggle connection between the two outermost of said pivoted frame members for holding the said canopy in one position in which the canopy is extended and covers the tray and window opening and in another position in which the canopy is folded and lies substantially in the plane of the tray along the edge opposite to the edge close to the said automobile body.

6. A canopy structure for attachment to a rectangular tray, said tray being supported from an automobile in substantially the plane of the lower edge of the window opening therein with one edge close to the automobile body, said canopy structure including a canopy, a plurality of U-shaped frame members pivotally mounted at their ends to said tray on separate but closely spaced axes for supporting said canopy, a toggle connection between the two outermost of said pivoted frame members for holding the said canopy in one position in which the canopy is extended and covers the tray and a portion of said window opening and in another position in which the canopy is folded and lies substantially in the plane of the tray along the edge opposite to the edge close to the said automobile body, a flap, spring biased clip members on said flap for mounting said flap in the plane of said window opening to said canopy supporting means to cooperate with said canopy to provide a cover for that portion of said window not covered by the said canopy when supported in an extended position by said canopy supporting means, a second flap pivotally mounted to said canopy supporting means and adapted to engage the edge of said tray opposite that edge close to the said automobile body, a spring mounted between said canopy supporting means and said flap to secure the engagement of said second flap with said tray, to provide a disengageable hatch for access to said tray when said canopy is in extended position.

7. A canopy structure for attachment to a rectangular tray, said tray being supported from an automobile in substantially the plane of the lower edge of the window opening therein with one edge close to the automobile body, said canopy structure including a canopy, a plurality of U-shaped frame members pivotally mounted at their ends to said tray for supporting said canopy, a toggle connection between the two outermost of said pivoted frame members for holding the said canopy in one position in which the canopy is extended and covers the tray and window opening and in another position in which the canopy is folded and lies substantially in the plane of the tray along the edge opposite to the edge close to the said automobile body.

HENRY W. MORELAND.

REFERENCES CITED

The following references are of record in the file of this patent:

UNITED STATES PATENTS

| Number | Name | Date |
| --- | --- | --- |
| 1,395,975 | Riley | Nov. 1, 1921 |
| 1,437,219 | Berthon | Nov. 28, 1922 |
| 1,884,160 | Orbick | Oct. 25, 1932 |
| 2,506,383 | Powers | May 2, 1950 |